United States Patent
Jeon et al.

(10) Patent No.: US 8,666,739 B2
(45) Date of Patent: Mar. 4, 2014

(54) METHOD FOR ESTIMATING LANGUAGE MODEL WEIGHT AND SYSTEM FOR THE SAME

(75) Inventors: Hyung Bae Jeon, Daejeon (KR); Yun Keun Lee, Daejeon (KR); Eui Sok Chung, Daejeon (KR); Jong Jin Kim, Daejeon (KR); Hoon Chung, Gangwon-do (KR); Jeon Gue Park, Seoul (KR); Ho Young Jung, Daejeon (KR); Byung Ok Kang, Gyeryong-si (KR); Ki Young Park, Daejeon (KR); Sung Joo Lee, Daejeon (KR); Jeom Ja Kang, Daejeon (KR); Hwa Jeon Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 247 days.

(21) Appl. No.: 13/324,414

(22) Filed: Dec. 13, 2011

(65) Prior Publication Data
US 2012/0150539 A1    Jun. 14, 2012

(30) Foreign Application Priority Data
Dec. 14, 2010    (KR) .................. 10-2010-0127907

(51) Int. Cl.
*G10L 15/00* (2013.01)
(52) U.S. Cl.
USPC .............................. 704/231; 704/10; 704/243
(58) Field of Classification Search
USPC ................... 704/10, 231, 235, 243–245, 255
See application file for complete search history.

(56) References Cited

U.S. PATENT DOCUMENTS

| | | | | |
|---|---|---|---|---|
| 7,716,049 | B2 * | 5/2010 | Tian | 704/251 |
| 7,983,917 | B2 * | 7/2011 | Kennewick et al. | 704/257 |
| 8,150,694 | B2 * | 4/2012 | Kennewick et al. | 704/257 |
| 8,457,959 | B2 * | 6/2013 | Kaiser | 704/231 |
| 2006/0074656 | A1 * | 4/2006 | Mathias et al. | 704/243 |
| 2010/0191530 | A1 * | 7/2010 | Nakano et al. | 704/244 |
| 2012/0022867 | A1 * | 1/2012 | Ballinger et al. | 704/235 |
| 2012/0053935 | A1 * | 3/2012 | Malegaonkar et al. | 704/235 |
| 2013/0166297 | A1 * | 6/2013 | Mathias et al. | 704/243 |

FOREIGN PATENT DOCUMENTS

| | | |
|---|---|---|
| KR | 1020040069060 A | 8/2004 |
| KR | 1020060067096 A | 6/2006 |
| KR | 1020100062831 A | 6/2010 |

* cited by examiner

*Primary Examiner* — Douglas Godbold

(57) ABSTRACT

Method of the present invention may include receiving speech feature vector converted from speech signal, performing first search by applying first language model to the received speech feature vector, and outputting word lattice and first acoustic score of the word lattice as continuous speech recognition result, outputting second acoustic score as phoneme recognition result by applying an acoustic model to the speech feature vector, comparing the first acoustic score of the continuous speech recognition result with the second acoustic score of the phoneme recognition result, outputting first language model weight when the first coustic score of the continuous speech recognition result is better than the second acoustic score of the phoneme recognition result and performing a second search by applying a second language model weight, which is the same as the output first language model, to the word lattice.

14 Claims, 2 Drawing Sheets

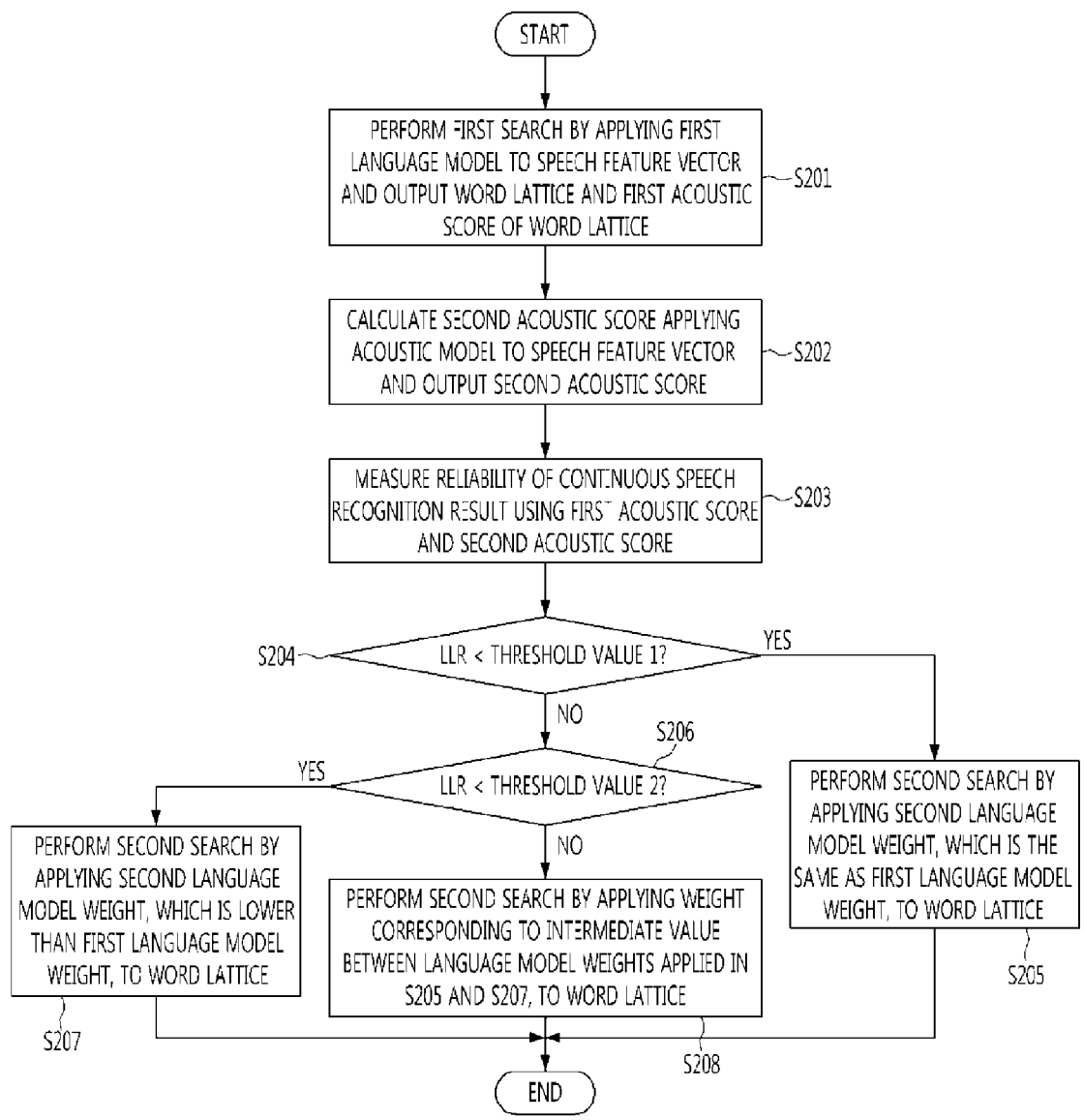

METHOD FOR ESTIMATING LANGUAGE MODEL WEIGHT AND SYSTEM FOR THE SAME

CROSS-REFERENCE TO RELATED PATENT APPLICATION

This application claims the benefit of Korean Patent Application No. 10-2010-0127907, filed on Dec. 14, 2010 in the Korean Intellectual Property Office, the disclosure of which is incorporated herein in its entirety by reference.

BACKGROUND OF THE INVENTION

1. Field of the Invention

The present invention relates to a method for estimating a language model weight and a system for the same and, more particularly, to a method for adaptively estimating a language model weight based on a continuous speech recognition result and a system for the same.

2. Description of the Related Art

In general, a language model plays a very important role in continuous speech recognition and is used to correct errors of an acoustic model and to represent the result. However, in the case of an N-gram language model, which is currently most widely used and considered as the standard of the speed recognition industry, the result may be very different according to the area of learning data. Moreover, when the area of speech to be recognized coincides with the area of language model learning data, the best performance can be expected. Thus, in the speech recognition, which covers many areas, such as broadcast news speech recognition, the accuracy of the speech recognition can be improved by a language model adaptation method in which the area of the language model is adapted to each subject.

A process of generating an N-best list of multiple recognition candidates for an utterance in a continuous speech recognition engine for the continuous speech recognition is as follows. Intermediate recognition results such as word lattices are output by performing a search based on a grammar network in which the connections between words are defined as a graph, and the word lattices are re-evaluated using collocation information of words, statistical language model information such as bigram and trigram probabilities, or A-Star algorithm, thereby generating the N-best list.

In the process of generating the N-best recognition candidates, the language model has a wide search space and requires a large number of calculations for recognition. Thus, a low-order language model is used in a first search to output a word lattice as a first search result, and a second search is performed by applying a higher-order language model than the language model used in the first search, a domain-specific language model, to the word lattice as the first search result.

During the second search, the beginning and end of given words in the word lattice are fixed, and only an acoustic score or language model score is newly calculated. Thus, the second search requires a smaller number of calculations than the first search. Here, when the language model is applied in the second search, as the weight on the acoustic score of the word lattice, a value determined from experiments is fixed and used. However, when the weight used in the second search is fixed, it is impossible to adaptively perform the second search based on the first search result. That is, even when the correct answer is not found in the first search as the score of the continuous speech recognition result is low, the second search is performed using the same weight, and thus the possibility of finding the correct answer is very low.

SUMMARY OF THE INVENTION

The present invention has been made in an effort to solve the above-described problems associated with prior art, and a first object of the present invention is to provide a system for adaptively estimating a language model weight based on a continuous speech recognition result.

A second object of the present invention is to provide a method for adaptively estimating a language model weight based on a continuous speech recognition result.

According to an aspect of the present invention to achieve the first object of the present invention, there is provided a system for estimating a language model weight, the system comprising: a first search unit which receives a speech feature vector converted from a speech signal, performs a first search by applying a first language model to the received speech feature vector, and outputs a word lattice and a first acoustic score of the word lattice as a continuous speech recognition result; a phoneme recognition unit which outputs a second acoustic score as a phoneme recognition result by applying an acoustic model to the speech feature vector; a weight estimation unit which compares the first acoustic score of the continuous speech recognition result of the first search unit with the second acoustic score of the phoneme recognition result of the phoneme recognition unit and, when the first acoustic score of the continuous speech recognition result is better than the second acoustic score of the phoneme recognition result, outputs a first language model weight; and a second search unit which performs a second search by applying a second language model weight, which is the same as the output first language model weight, to the word lattice and outputs a final recognition result.

According to another aspect of the present invention to achieve the second object of the present invention, there is provided a method for estimating a language model weight, the method comprising: receiving a speech feature vector converted from a speech signal, performing a first search by applying a first language model to the received speech feature vector, and outputting a word lattice and a first acoustic score of the word lattice as a continuous speech recognition result; outputting a second acoustic score as a phoneme recognition result by applying an acoustic model to the speech feature vector; comparing the first acoustic score of the continuous speech recognition result with the second acoustic score of the phoneme recognition result; outputting a first language model weight when the first acoustic score of the continuous speech recognition result is better than the second acoustic score of the phoneme recognition result; and performing a second search by applying a second language model weight, which is the same as the output first language model, to the word lattice.

BRIEF DESCRIPTION OF THE DRAWINGS

The above and other features and advantages of the present invention will become more apparent by describing in detail exemplary embodiments thereof with reference to the attached drawings in which:

FIG. 2 is a flowchart showing a method for estimating a language model weight in accordance with another exemplary embodiment of the present invention.

DETAILED DESCRIPTION OF THE INVENTION

Figure 1:
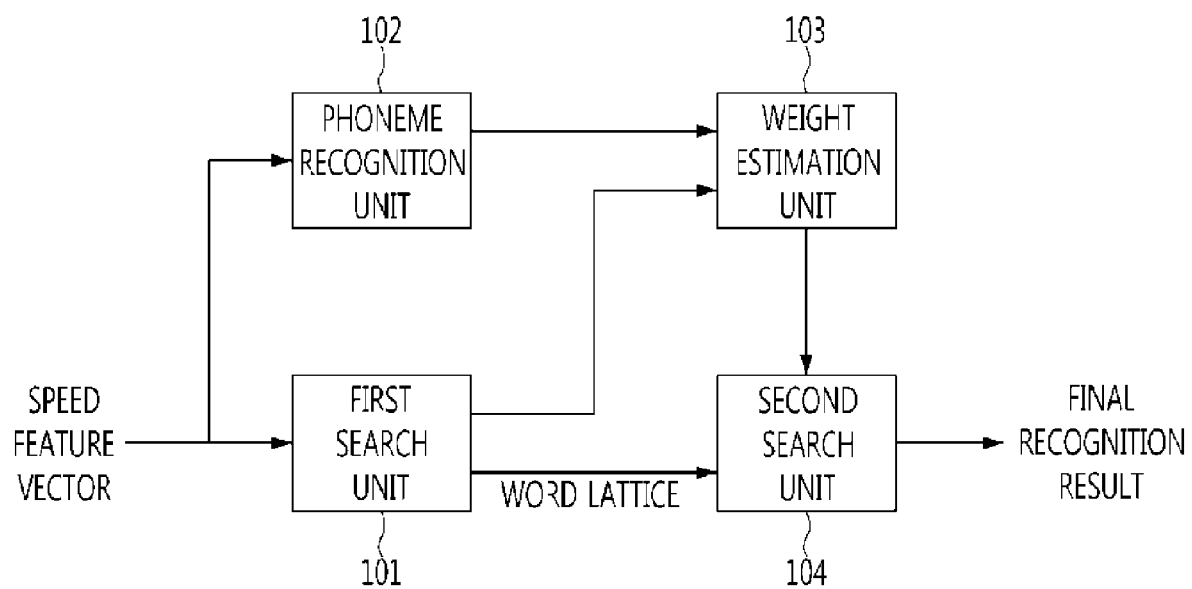
FIG. 1 is a schematic diagram showing the internal structure of a language model weight estimation system in accordance with an exemplary embodiment of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B etc. may be used herein to describe various elements, these elements should not be limited by these terms. These terms are only used to distinguish one element from another. For example, a first element could be termed a second element, and similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

FIG. 1 is a schematic diagram showing the internal structure of a language model weight estimation system in accordance with an exemplary embodiment of the present invention.

Referring to FIG. 1, a language model weight estimation system may comprise a first search unit 101, a phoneme recognition unit 102, a weight estimation unit 103, and a second search unit 104.

The first search unit 101 receives a speech feature vector converted from a speech signal, performs a first search by applying a first language model to the received speech feature vector, outputs a word lattice to the second search unit 104, and outputs a first acoustic score of the word lattice to the weight estimation unit 103.

Here, the word lattice is obtained by defining a plurality of word combinations searched by the first search unit 101 as information about connections between words and includes information used to evaluate the speech recognition result of the first search unit 101, for example, the first acoustic score of the words estimated to have a high possibility during the first search performed by the first search unit 101, the language model score, the beginning and end of the words, the language model score information according to the previous pass of each word, etc.

The phoneme recognition unit 102 receives a speech feature vector converted from a speech signal and outputs a second acoustic score of the word lattice by applying an acoustic model to the received speech feature vector. According to this exemplary embodiment of the present invention, the phoneme recognition unit 102 receives a speech feature vector converted from a speech signal, performs phoneme recognition based on a phoneme search network comprising "consonant+vowel+consonant" in Korean, and outputs the second acoustic score of the word lattice to the weight estimation unit 103.

The weight estimation unit 103 receives the first acoustic score output from the first search unit 101 and the second acoustic score output from the phoneme recognition unit 102 and estimates a weight by applying the first acoustic score and the second acoustic score to the conversion function of formula 1.

$$LLR = \text{second acoustic score} - \text{first acoustic score} \quad \text{[Formula 1]}$$

Referring to formula 1, the LLR is a log-likelihood ratio value used as an estimate for estimating a second language model weight using the first acoustic score output from the first search unit 101 and the second acoustic score output from the phoneme recognition unit 102. The first acoustic score represents a log value of acoustic scores of a 1-best word string as the speech recognition result determined by the first search unit 101, and the second acoustic score represents a log value of acoustic scores of a 1-best phoneme string as speech recognition result determined by the phoneme recognition unit 102.

First, the estimation of a weight, which is performed by the weight estimation unit 103 when the weight estimation unit 103 determines from the first acoustic score and the second acoustic score that the first acoustic score of the continuous speech recognition result of the first search unit 101 is better than the second acoustic score of the phoneme recognition result of the phoneme recognition unit 102 and thus determines that the reliability of the recognition result is high, will be described below.

According to this exemplary embodiment of the present invention, the weight estimation unit 103 compares a value, calculated by applying the continuous speech recognition result output from the first search unit 101 and the phoneme recognition result output from the phoneme recognition unit 102 to formula 1, with threshold value 1. If it is determined that the calculated value is smaller than threshold value 1, the weight estimation unit 103 determines that the acoustic score of the continuous speech recognition result of the first search unit 101 is better than the acoustic score of the phoneme recognition result of the phoneme recognition unit 102 and thus that the reliability of the recognition result is high and outputs the language model weight used by the first search unit 101 to the second search unit 104.

Second, the estimation of a weight, which is performed by the weight estimation unit 103 when the weight estimation unit 103 determines from the first acoustic score and the second acoustic score that the first acoustic score of the continuous speech recognition result of the first search unit 101 is worse than the second acoustic score of the phoneme recognition result of the phoneme recognition unit 102 and thus determines that the reliability of the recognition result is low, will be described below. According to this exemplary embodiment of the present invention, the weight estimation unit 103 compares a value, calculated by applying the continuous speech recognition result output from the first search unit 101 and the phoneme recognition result output from the phoneme recognition unit 102 to formula 1, with threshold value 2.

If it is determined that the calculated value is greater than threshold value 2, the weight estimation unit 103 determines that the acoustic score of the continuous speech recognition result of the first search unit 101 is worse than the acoustic score of the phoneme recognition result of the phoneme recognition unit 102 and thus that the reliability of the recognition result is low and outputs a weight lower than the language model weight used by the first search unit 101 to the second search unit 104.

Third, when it is determined from the first acoustic score and the second acoustic score that the first acoustic score of the continuous speech recognition result of the first search unit 101 is neither better nor worse than the second acoustic score of the phoneme recognition result of the phoneme recognition unit 102, the weight estimation unit 103 outputs a weight corresponding to an intermediate value between the first language model weight and the second language model weight to the second search unit 104.

The second search unit 104 performs a second search by applying the weight received from the weight estimation unit 103 to a second language model. First, when the weight estimation unit 103 determines from the first acoustic score and the second acoustic score that the first acoustic score of the continuous speech recognition result of the first search unit 101 is better than the second acoustic score of the phoneme recognition result of the phoneme recognition unit 102 and thus determines that the reliability of the recognition result is high, the second search unit 104 receives the language model weight used by the first search unit 101 and performs the second search by applying the second language model weight, which is the same as the received language model weight used by the first search unit 101, to the word lattice output from the first search unit 101. Here, the second search unit 104 fixes the acoustic score of the word lattice output from the first search unit 101, calculates a language model score, in which the second language model weight, which is the same as the first language model weight received from the weight estimation unit 103, is applied, updates the cumulative scores of the entire pass, and outputs a recognition result having the highest score as a final recognition result.

Second, when the weight estimation unit 103 determines from the first acoustic score and the second acoustic score that the first acoustic score of the continuous speech recognition result of the first search unit 101 is worse than the second acoustic score of the phoneme recognition result of the phoneme recognition unit 102 and thus determines that the reliability of the recognition result is low, the second search unit 104 receives a weight lower than the language model weight used by the first search unit 101 and performs the second search by applying a second language model weight, which is lower than the language model weight used by the first search unit 101, to the word lattice output from the first search unit 101. Here, the second search unit 104 fixes the acoustic score of the word lattice output from the first search unit 101, calculates a language model score, in which the second language model weight, which is lower than the first language model weight received from the weight estimation unit 103, is applied, updates the cumulative scores of the entire pass, and outputs a recognition result having the highest score as a final recognition result.

Third, when the weight estimation unit 103 determines from the first acoustic score and the second acoustic score that the first acoustic score of the continuous speech recognition result of the first search unit 101 is neither better nor worse than the second acoustic score of the phoneme recognition result of the phoneme recognition unit 102, the second search unit 104 receives a weight corresponding to an intermediate value between the first language model weight and the second language model weight and performs the second search by applying the received language model weight.

Next, a method for estimating a language model weight in accordance with another exemplary embodiment of the present invention will be described in more detail with reference to FIG. 2.

FIG. 2 is a flowchart showing a method for estimating a language model weight in accordance with another exemplary embodiment of the present invention.

Referring to FIG. 2, a language model weight estimation system receives a speech feature vector converted from a speech signal, performs a first search by applying a first language model to the received speech feature vector, and outputs a word lattice and a first acoustic score of the word lattice (S201). Here, the word lattice is obtained by defining a plurality of word combinations searched by the first search as information about connections between words and includes information used to evaluate the speech recognition result, for example, the first acoustic score of the words estimated to have a high possibility during the first search, the language model scores, the beginning and end of the words, the language model score information according to the previous pass of each word, etc.

The language model weight estimation system calculates a second acoustic score applying an acoustic model to the received speech feature vector and outputs the second acoustic score (S202). According to this exemplary embodiment of the present invention, the language model weight estimation system receives a speech feature vector converted from a speech signal, performs phoneme recognition based on a phoneme search network comprising "consonant+vowel+consonant" in Korean, and outputs the second acoustic score of the speech feature vector.

The language model weight estimation system measures the reliability of the continuous speech recognition result using the received first acoustic score and second acoustic score (S203). If it is determined that the reliability measured by the language model weight estimation system is smaller than threshold value 1 (S204), it is determined that the acoustic score of the continuous speech recognition result is better than the acoustic score of a phoneme recognition result and thus that the reliability of the recognition result is high, and thus the language model weight estimation system performs the second search by applying a second language model weight, which is the same as a first language model weight, to the word lattice and outputs a final recognition result (S205).

On the contrary, if it is determined that the reliability measured by the language model weight estimation system is greater than threshold value 1 (S204), the language model weight estimation system compares the measured reliability with threshold value 2 (S206). If it is determined that the reliability measured by the language model weight estimation system is greater than threshold value 2, it is determined that the acoustic score of the continuous speech recognition result is worse than the acoustic score of the phoneme recognition result and thus that the reliability of the recognition result is low, and thus the language model weight estimation system performs the second search by applying a second language model weight, which is lower than the first language model weight, to the word lattice, and outputs a final recognition result (S207).

Whereas, if it is determined that the reliability measured by the language model weight estimation system is smaller than threshold value 2, the acoustic score of the continuous speech recognition result is neither better nor worse than the acoustic score of the phoneme recognition result, and thus the language model weight estimation system performs the second search by applying a weight corresponding to an intermediate value between threshold value 1 and threshold value 2, to the word lattice and outputs a final recognition result (S208).

As described above, according to the method for adaptively estimating the language model weight based on the continuous speech recognition result and the system for the same, when the correct answer is found in the first search, the same language model weight is applied in the second search, and when the correct answer is not found in the first search, a lower language model weight is applied in the second search to increase the proportion of the score, thereby increasing the possibility of finding the correct answer. As a result, the performance of the second search is increased, and thus the improvement in performance of the continuous speech recognition system can be expected.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A system for estimating a language model weight, the system comprising:
    a first search unit which receives a speech feature vector converted from a speech signal, performs a first search by applying a first language model to the received speech feature vector, and outputs a word lattice and a first acoustic score of the word lattice as a continuous speech recognition result;
    a phoneme recognition unit which outputs a second acoustic score as a phoneme recognition result by applying an acoustic model to the speech feature vector;
    a weight estimation unit which compares the first acoustic score of the continuous speech recognition result of the first search unit with the second acoustic score of the phoneme recognition result of the phoneme recognition unit and, when the first acoustic score of the continuous speech recognition result is better than the second acoustic score of the phoneme recognition result, outputs a first language model weight; and
    a second search unit which performs a second search by applying a second language model weight, which is the same as the output first language model weight, to the word lattice and outputs a final recognition result.

2. The system of claim 1, wherein when the first acoustic score of the continuous speech recognition result is worse than the second acoustic score of the phoneme recognition result, the weight estimation unit outputs a weight which is lower than the first language model weight.

3. The system of claim 2, wherein the second search unit performs the second search by applying a second language model weight which is lower than the first language model weight.

4. The system of claim 1, wherein when the first acoustic score of the continuous speech recognition result is neither better nor worse than the second acoustic score of the phoneme recognition result, the weight estimation unit outputs a weight corresponding to an intermediate value between the first language model weight and the second language model weight.

5. The system of claim 4, wherein the second search unit performs the second search by applying the weight corresponding to the intermediate value between the first language model weight and the second language model weight.

6. The system of claim 1, wherein the word lattice is obtained by defining a plurality of word combinations searched by the first search as information about connections between words.

7. The system of claim 1, wherein the word lattice comprises information used to evaluate the continuous speech recognition result of the first search unit.

8. A method for estimating a language model weight, the method comprising:
    receiving a speech feature vector converted from a speech signal, performing a first search by applying a first language model to the received speech feature vector, and outputting a word lattice and a first acoustic score of the word lattice as a continuous speech recognition result;
    outputting a second acoustic score as a phoneme recognition result by applying an acoustic model to the speech feature vector;
    comparing the first acoustic score of the continuous speech recognition result with the second acoustic score of the phoneme recognition result;
    outputting a first language model weight when the first acoustic score of the continuous speech recognition result is better than the second acoustic score of the phoneme recognition result; and
    performing a second search by applying a second language model weight, which is the same as the output first language model, to the word lattice.

9. The method of claim 8, wherein in the outputting of the weight, when the first acoustic score of the continuous speech recognition result is worse than the second acoustic score of the phoneme recognition result, a weight which is lower than the first language model weight is output.

10. The method of claim 9, wherein in the performing of the second search, a second language model weight which is lower than the first language model weight is applied.

11. The method of claim 8, wherein in the outputting of the weight, when the first acoustic score of the continuous speech recognition result is neither better nor worse than the second acoustic score of the phoneme recognition result, a weight corresponding to an intermediate value between the first language model weight and the second language model weight is output.

12. The method of claim 11, wherein in the performing the second search, the weight corresponding to the intermediate value between the first language model weight and the second language model weight is applied.

13. The method of claim 8, wherein the word lattice is obtained by defining a plurality of word combinations searched by the first search as information about connections between words.

14. The method of claim 8, wherein the word lattice comprises information used to evaluate the continuous speech recognition result of the first search unit.

\* \* \* \* \*